(12) United States Patent
Todaka et al.

(10) Patent No.: US 12,308,729 B2
(45) Date of Patent: May 20, 2025

(54) ROTARY ELECTRIC MACHINE HOUSING, ROTARY ELECTRIC MACHINE, AND ADDITIVE MANUFACTURING METHOD

(71) Applicant: HONDA MOTOR CO., LTD., Tokyo (JP)

(72) Inventors: Hirosumi Todaka, Saitama (JP); Yasunari Kimura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 18/128,047

(22) Filed: Mar. 29, 2023

(65) Prior Publication Data

US 2023/0318405 A1 Oct. 5, 2023

(30) Foreign Application Priority Data

Mar. 31, 2022 (JP) .................................. 2022-060351

(51) Int. Cl.
| | |
|---|---|
| *H02K 9/18* | (2006.01) |
| *H02K 5/02* | (2006.01) |
| *H02K 7/14* | (2006.01) |
| *H02K 9/08* | (2006.01) |

(52) U.S. Cl.
CPC ................. *H02K 9/18* (2013.01); *H02K 5/02* (2013.01); *H02K 7/14* (2013.01); *H02K 9/08* (2013.01)

(58) Field of Classification Search
CPC .......... H02K 5/02; H02K 5/203; H02K 5/207; H02K 7/14; H02K 9/08; H02K 9/18; H02K 9/197
See application file for complete search history.

(56) References Cited

U.S. PATENT DOCUMENTS

| | | | | |
|---|---|---|---|---|
| 2004/0191100 | A1* | 9/2004 | Nakane | F04C 29/045 418/55.1 |
| 2014/0111050 | A1* | 4/2014 | Chamberlin | H02K 7/145 29/598 |
| 2016/0281740 | A1* | 9/2016 | Mitsuda | H02K 5/203 |

FOREIGN PATENT DOCUMENTS

| | | |
|---|---|---|
| JP | 4206799 B2 | 1/2009 |
| JP | 6428434 B2 | 11/2018 |

* cited by examiner

*Primary Examiner* — Naishadh N Desai
(74) *Attorney, Agent, or Firm* — Paratus Law Group, PLLC (57) ABSTRACT

A rotary electric machine housing is configured to accommodate a component of a rotary electric machine. The rotary electric machine housing includes a body portion configured to be in a hollow shape and having an accommodation space in which the component is accommodated, a water jacket provided at the body portion, an oil flow path communicating with the accommodation space and through which an oil to be supplied to the component flows, and a gas flow path communicating with the accommodation space and through which a gas to be supplied to the component flows. The oil flow path and the gas flow path are provided to enable the oil and the gas to exchange heat with a coolant flowing through the water jacket.

10 Claims, 6 Drawing Sheets

ROTARY ELECTRIC MACHINE HOUSING, ROTARY ELECTRIC MACHINE, AND ADDITIVE MANUFACTURING METHOD

CROSS-REFERENCE TO RELATED APPLICATIONS

This application is based on and claims priority under 35 USC 119 from Japanese Patent Application No. 2022-060351 filed on Mar. 31, 2022. The entire content of the priority application is incorporated herein by reference.

TECHNICAL FIELD

The present disclosure relates to a rotary electric machine housing, a rotary electric machine, and an additive manufacturing method.

BACKGROUND ART

In recent years, researches and development that contribute to an energy efficiency have been carried out to ensure access to convenient, reliable, sustainable, and advanced energy for more people.

A rotary electric machine such as a motor or a power generator is required to prevent a decrease in an output in order to improve an energy efficiency. Since the output decreases when a temperature of the rotary electric machine becomes high, it is necessary to provide the rotary electric machine with a cooling mechanism to prevent the decrease in output. For example, JP4206799B and JP6428434B disclose that cooling water flows through a water jacket provided in a housing of a motor to cool the motor. JP6428434B also discloses a configuration in which an oil is supplied into the motor to cool the motor, and an oil cooler is provided to cool the oil.

By the way, an internal combustion engine such as a gas turbine engine may be connected to the rotary electric machine. When studying an energy efficiency of a rotary electric machine, it may be effective to pay attention not only to energy of the rotary electric machine but also to energy of an entire system including the rotary electric machine and the internal combustion engine. For example, it is conceivable to effectively utilize a gas generated in the internal combustion engine (for example, a high-temperature compressed air generated by being compressed by a compressor of the internal combustion engine) for cooling the rotary electric machine.

When the gas generated in an internal combustion engine is supplied to the rotary electric machine, a cooling mechanism for cooling the high-temperature gas is required. JP4206799B discloses a configuration in which the compressed gas is supplied to a fuel cell, although it is not a configuration in which the gas is supplied to the rotary electric machine, and an intercooler for cooling the compressed gas is provided.

When considering the configuration in which in addition to the oil, the gas is supplied to the rotary electric machine, the oil cooler for cooling the oil and the intercooler for cooling the gas are provided, so that a size of the rotary electric machine may increase.

SUMMARY

The present disclosure provides a rotary electric machine and a rotary electric machine housing that can make a cooling mechanism for cooling an oil and a gas compact in the rotary electric machine through which the oil and the gas flow. An additive manufacturing method that manufactures such a rotary electric machine housing is also provided.

A first aspect of the present disclosure relates to a rotary electric machine housing configured to accommodate a component of a rotary electric machine, the rotary electric machine housing including:
- a body portion configured to be in a hollow shape and having an accommodation space in which the component is accommodated;
- a water jacket provided at the body portion;
- an oil flow path communicating with the accommodation space and through which an oil to be supplied to the component flows; and
- a gas flow path communicating with the accommodation space and through which a gas to be supplied to the component flows,
- in which the oil flow path and the gas flow path are provided to enable the oil and the gas to exchange heat with a coolant flowing through the water jacket.

A second aspect of the present disclosure relates to a rotary electric machine, including:
- the rotary electric machine housing according to claim 1; and
- a rotor and a stator accommodated in the body portion,
- in which a rotor shaft of the rotor is connected to a rotating shaft of the internal combustion engine in which the gas is generated,
- the gas flow path communicates with a gas outflow port of the internal combustion engine,
- the water jacket cools the gas flowing through the gas flow path, and
- at least one of the rotor or the stator is supplied with the gas cooled while flowing through the gas flow path.

A third aspect of the present disclosure relates to an additive manufacturing method of additively manufacturing the rotary electric machine housing by using powder metal, the additive manufacturing method including:
- integrally forming the body portion, the gas flow path, the oil flow path, and the water jacket.

According to the present disclosure, the cooling mechanism for cooling the oil and the gas can be made compact in the rotary electric machine through which the oil and the gas flow.

BRIEF DESCRIPTION OF DRAWINGS

Exemplary embodiment(s) of the present disclosure will be described in detail based on the following figures, wherein.

DESCRIPTION OF EMBODIMENTS

Hereinafter, an embodiment of a rotary electric machine of the present disclosure will be described with reference to the drawings.

Figure 1:
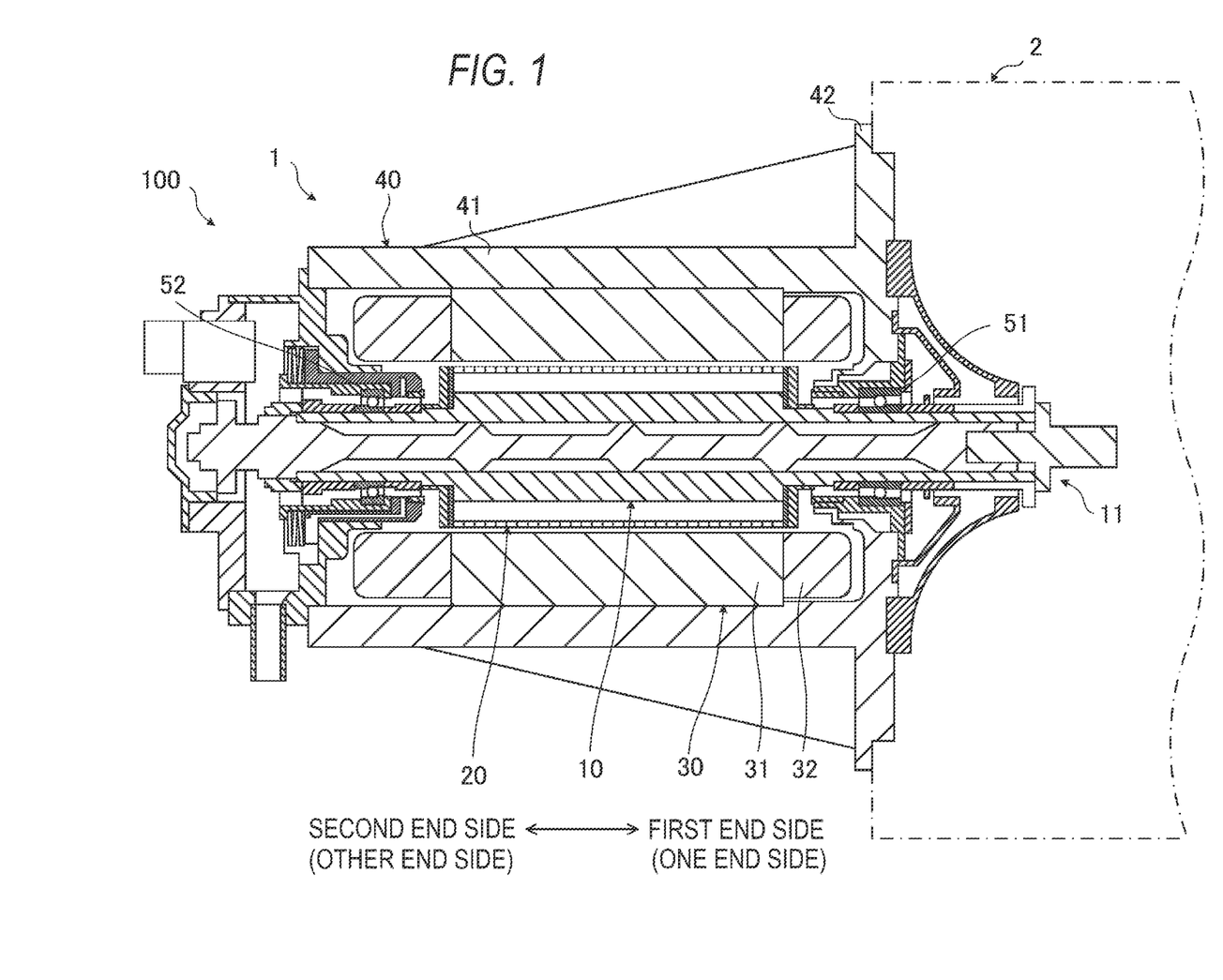
FIG. 1 is a schematic cross-sectional view of a power generator 1.

As shown in FIG. 1, a power generator 1 which is an example of the rotary electric machine of the present disclosure includes a rotor shaft 10, a rotor 20 rotating integrally with the rotor shaft 10, a stator 30 disposed in a radial direction at a predetermined distance from an outer peripheral surface of the rotor 20, a housing 40 that accommodates the rotor 20 and the stator 30, and a pair of bearings 51 and 52 that are disposed on one end side and the other end side in an axial direction with the rotor 20 interposed therebetween and rotatably support the rotor shaft 10 with respect to the housing 40. A permanent magnet (not shown) is attached to the rotor 20, and a coil 32 is wound around a stator core 31 of the stator 30.

A gas turbine engine 2, which is an example of the internal combustion engine, is connected to the power generator 1. Although not shown, the gas turbine engine 2 causes a turbine to rotate by an exhaust flow when a high-temperature and high-pressure combustion gas, which is generated by combusting air and fuel (methanol, gasoline, and the like) compressed by a compressor in a combustion chamber, is exhausted. The turbine is coaxially connected to a turbine connecting portion 11 provided on the rotor shaft 10 of the power generator 1, and the rotor shaft 10 rotates as the turbine rotates. That is, the power generator 1 and the gas turbine engine 2 constitute a power generation system 100, and the power generator 1 generates power according to an output of the gas turbine engine 2. Hereinafter, a gas turbine engine 2 side in the axial direction of the power generator 1 is also referred to as a first end side, and an opposite side thereof is also referred to as a second end side.

A part of high-temperature and high-pressure air (hereinafter, also simply referred to as gas) generated by being compressed by the compressor of the gas turbine engine 2 flows through a gas outflow path (not shown) of the gas turbine engine 2 and is supplied to gas flow paths 70 of the housing 40, which will be described later. The combustion gas exhausted from the gas turbine engine 2 may be supplied to the gas flow paths 70 of the housing 40 through a purification filter or the like.

Next, details of the housing 40 will be described with reference to FIG. 2 to FIG. 6. In FIG. 2 to FIG. 5, a flow of coolant is indicated by solid lines, a flow of gas is indicated by one-dot chain lines, and a flow of oil is indicated by a two-dot chain line.

The housing 40 includes a body portion 41 and a flange portion 42 provided at an end portion of the body portion 41 on the first end side. The flange portion 42 is fixed to the gas turbine engine 2 (see FIG. 1).

Figure 3:
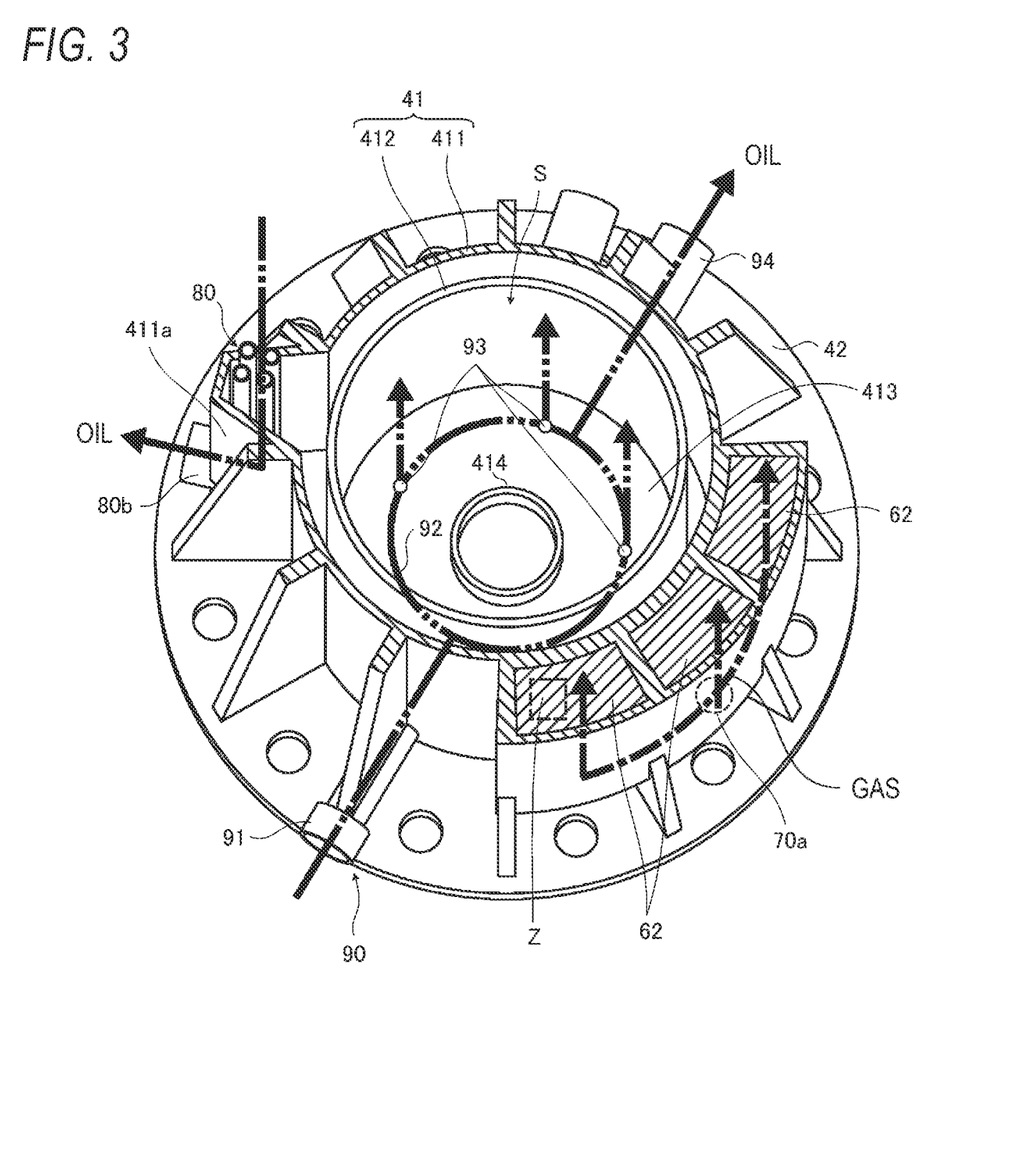
FIG. 3 is a view of the housing 40 notched in a Y plane of FIG. 2 as viewed obliquely from above, and is a schematic diagram showing a flow of oil to be supplied from an oil supply portion 90 and flows of gas flowing through gas flow paths 70.

As shown in FIG. 3, the body portion 41 is configured to be in a hollow shape and has a double cylindrical shape. The body portion 41 has an outer wall 411 on a radially outer side and an inner wall 412 provided radially from an inner peripheral surface of the outer wall 411 at a predetermined interval. Components of the power generator 1, such as the rotor 20, the stator 30, and the bearings 51 and 52 are arranged in an accommodation space S radially inward of the inner wall 412. The body portion 41 has a bottom wall 413 provided at the end portion on the first end side and positioned radially inward of the flange portion 42. A hole 414 through which the rotor shaft 10 can insert is provided in the bottom wall 413.

The housing 40 includes an oil supply portion 90, a water jacket 60, the gas flow paths 70, and an oil flow path 80.

As shown in FIG. 3, the oil supply portion 90 is provided on the first end side of the housing 40 and supplies an oil to the accommodation space S from the outside of the housing 40. The oil supply portion 90 includes an oil supply port 91 that serves as an oil inflow port, an oil supply flow path 92 that communicates with the oil supply port 91 and is provided in the bottom wall 413, and three oil supply holes 93 that are provided in the oil supply flow path 92 and communicate with the accommodation space S. In the present embodiment, the three oil supply holes 93 are provided, but the number of the oil supply holes 93 is optional.

The oil is introduced from the oil supply port 91, passes through the oil supply flow path 92, and is supplied to the accommodation space S from the oil supply holes 93. The oil flows through the accommodation space S from the first end side to the second end side, and is used for cooling and lubricating the components such as the rotor 20, the stator 30, and the bearings 51 and 52.

The oil supply portion 90 is provided with a second oil outflow port 94 that communicates with the oil supply flow path 92 and discharges the oil supplied to the oil supply flow path 92 to the outside of the housing 40. The oil discharged from the second oil outflow port 94 circulates so as to be supplied again from the oil supply port 91 to the accommodation space S through an external oil flow path (not shown).

Figure 4:
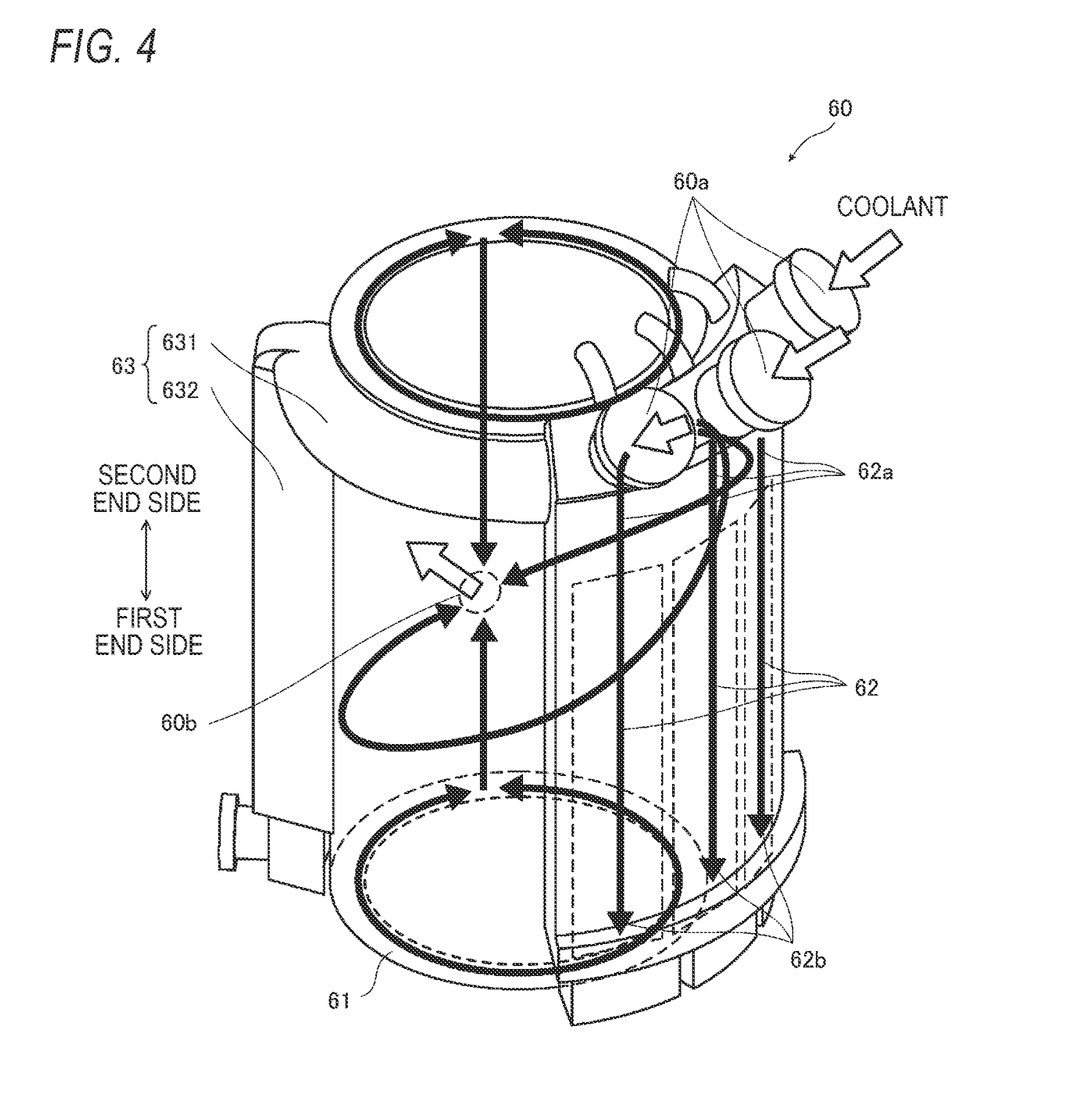
FIG. 4 is a schematic diagram showing a flow of coolant in a water jacket 60.
Figure 5:
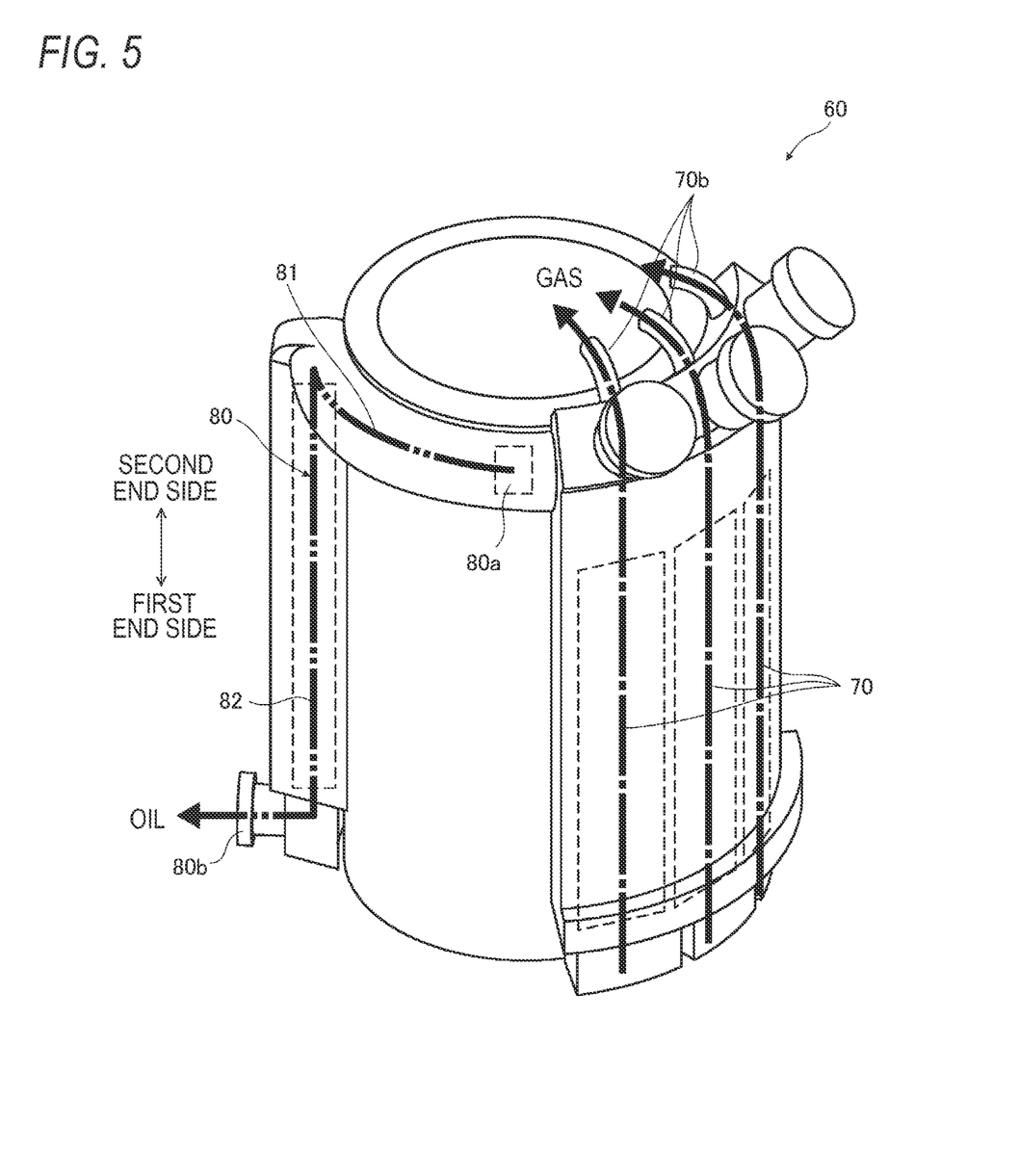
FIG. 5 is a schematic diagram showing the flows of gas in the gas flow paths 70 and the flow of oil in an oil flow path 80 in the water jacket 60.

The water jacket 60 cools the components of the power generator 1 by supplying a coolant (for example, cooling water) inside. For example, a space between the outer wall 411 and the inner wall 412 shown in FIG. 3 is part of the water jacket 60. FIG. 4 shows an appearance of the water jacket 60, in other words, shows a member from which the coolant flowing through the water jacket 60 is extracted. In FIG. 4, not only the water jacket 60 but also gas outflow ports 70b of the gas flow paths 70 and a first oil outflow port 80b of the oil flow path 80 are shown. FIG. 5 similarly shows the appearance of the water jacket 60. Details of the water jacket 60 will be described later.

Figure 2:
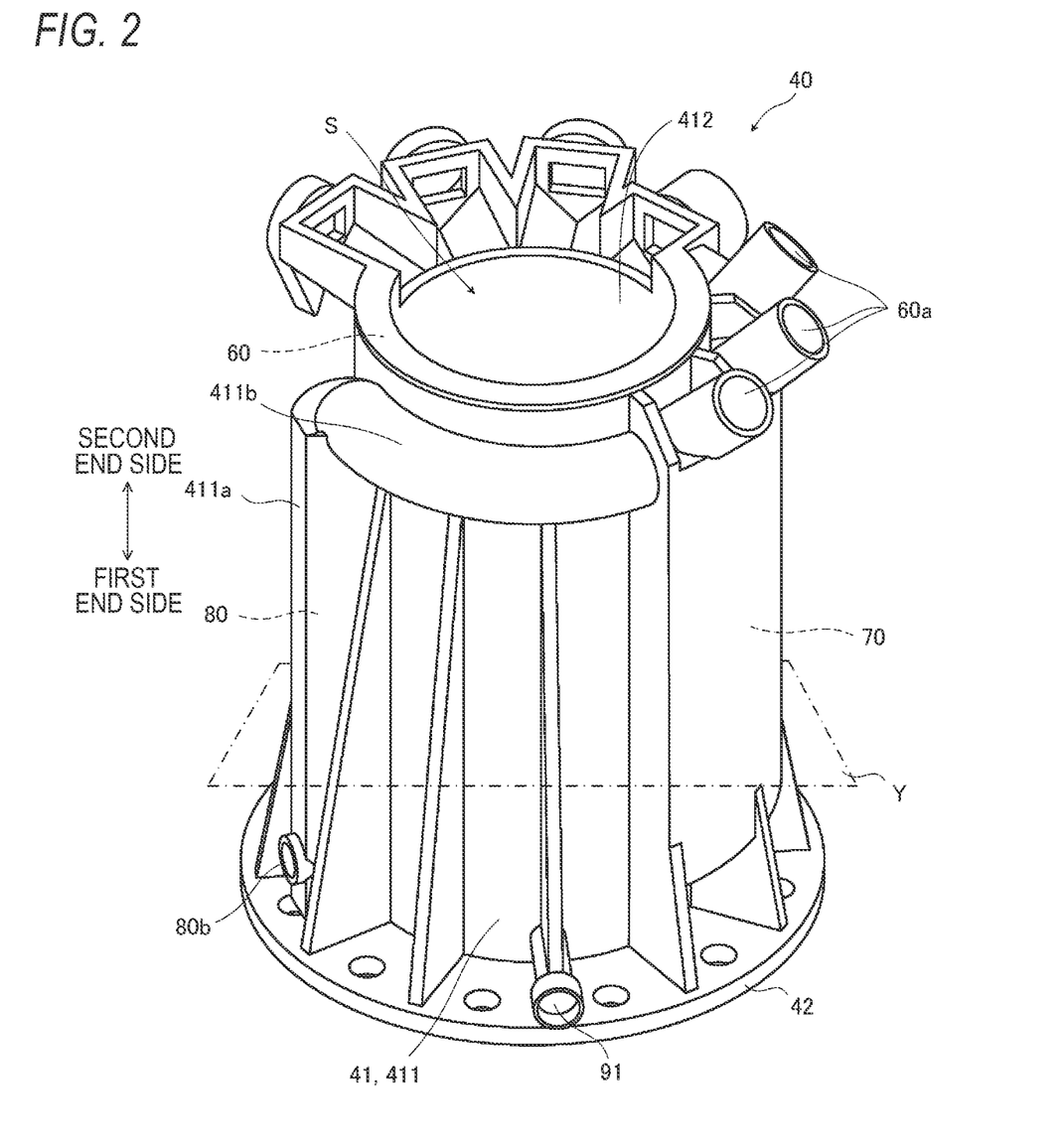
FIG. 2 is a perspective view of a housing 40 of the power generator 1.

The high-temperature gas generated by the gas turbine engine 2 flows through the gas flow paths 70. As shown in FIG. 2, FIG. 3, and FIG. 5, the gas flow paths 70 are positioned radially outward of the outer wall 411 and are provided along part of the outer wall 411 in a circumferential direction.

As shown in FIG. 3 and FIG. 5, each gas flow path 70 includes a gas inflow port 70a provided at the bottom wall 413 and a gas outflow port 70b provided on the second end side. The gas flow path 70 is provided to extend from the first end side to the second end side of the housing 40. The gas inflow port 70a communicates with a gas outflow port of the gas turbine 5 engine 2, and the high-temperature gas is introduced into the gas flow path 70 from the gas inflow port 70a The gas outflow port 70b of the gas flow path 70 communicates with the accommodation space S of the housing 40.

The high-temperature gas generated in the gas turbine engine 2 exchanges heat with the coolant flowing through the water jacket 60 while flowing through the gas flow paths 70, is cooled, and is supplied to the accommodation space S. Details of the heat exchange between the gas and the coolant will be described later.

The oil supplied from the oil supply portion 90 to the accommodation space S is guided to the oil flow path 80. As shown in FIG. 2 and FIG. 3, a protruding portion 411a protruding radially outward is formed on the outer wall 411 on an opposite side of the gas flow paths 70 with the accommodation space S interposed between the protruding portion 411a and the gas flow paths 70. The protruding portion 411a extends in an axial direction of the housing 40, and part of the oil flow path 80 is provided in a space between the protruding portion 411a and the inner wall 412. A protruding portion 411b extending from the vicinity of the gas flow path 70 to the protruding portion 411a is formed on the outer wall 411 on the second end side.

Specifically, as shown in FIG. 3 and FIG. 5, the oil flow path 80 includes an oil inflow port 80a provided in the vicinity of the gas flow path 70 on the second end side, and the first oil outflow port 80b provided on the first end side of the protruding portion 411a. The oil flow path 80 includes a circumferential oil flow path 81 provided in a space between the protruding portion 411b and the inner wall 412, and an axial oil flow path 82 provided in the space between the protruding portion 411a and the inner wall 412. The circumferential oil flow path 81 is provided to extend from the oil inflow port 80a to the protruding portion 411a on the second end side. The axial oil flow path 82 is connected to the circumferential oil flow path 81 and the first oil outflow port 80b and extends from the second end side to the first end side.

The oil flow path 80 includes a plurality of pipes as shown in FIG. 3. The oil inflow port 80a communicates with the accommodation space S. The first oil outflow port 80b communicates with the external oil flow path (not shown), and the oil circulates such that the oil is supplied again from the oil supply port 91 to the accommodation space S through the external oil flow path (not shown).

The oil guided to the oil flow path 80 exchanges heat with the coolant flowing through the water jacket 60 while flowing through the oil flow path 80, is cooled, and is supplied again to the accommodation space S through the external oil flow path. Details of the heat exchange between the oil and the coolant will be described later.

Accordingly, the housing 40 of the present embodiment is configured such that the gas and the oil flow through the gas flow paths 70 and the oil flow path 80, respectively, and exchange the heat with the coolant flowing through the water jacket 60.

Details of the water jacket 60 will be described below.

As shown in FIG. 4, the water jacket 60 includes a first coolant flow path 61 corresponding to the space between the outer wall 411 and the inner wall 412, second coolant flow paths 62 provided along the gas flow paths 70 (see FIG. 5), and a third coolant flow path 63 corresponding to the space between the protruding portions 411a and 411b and the inner wall 412 and provided along the oil flow path 80 (see FIG. 5). Since the protruding portions 411a and 411b are part of the outer wall 411, the third coolant flow path 63 can also be said to be part of the first coolant flow path 61.

The water jacket 60 includes coolant inflow ports 60a which are coolant supply ports and a coolant outflow port 60b which is a coolant discharge port. The coolant is supplied into the water jacket 60 from the coolant inflow ports 60a, flows to fill the first coolant flow path 61, the second coolant flow paths 62, and the third coolant flow path 63, and is discharged from the coolant outflow port 60b. Three coolant inflow ports 60a are provided in a portion in the circumferential direction on the second end side of the water jacket 60. This portion is located on the second end side of the gas flow path 70. The coolant outflow port 60b is provided on an opposite side of the coolant inflow ports 60a in the circumferential direction of the water jacket 60 and at substantially a center in the axial direction. Although the three coolant inflow ports 60a are provided, the present invention is not limited thereto, and the number of coolant inflow ports 60a is optional.

Although not shown, the coolant inflow ports 60a and the coolant outflow port 60b are in communication with an external flow path to form a circulation flow path. A pump and a heat exchanger are provided in the circulation flow path, and configured to supply a sufficiently cooled coolant into the water jacket 60 from the coolant inflow ports 60a.

The first coolant flow path 61 has a hollow cylindrical shape. Since the coolant in the first coolant flow path 61 fills the first coolant flow path 61 in a manner of covering the accommodation space S from the outside in the radial direction, the components in the accommodation space S can be cooled.

Similar to the gas flow paths 70, the second coolant flow paths 62 are positioned radially outward of the outer wall 411 and provided along the part of the outer wall 411 in the circumferential direction. The second coolant flow paths 62 is provided to extend from the second end side to the first end side along the gas flow paths 70. In other words, the gas flow paths 70 are flow paths provided in the water jacket 60 and are flow paths going through the coolant in the water jacket 60.

As shown in FIG. 4, in each second coolant flow path 62, an inflow port 62a provided on the second end side communicates with the first coolant flow path 61 and/or the coolant inflow port 60a, and an outflow port 62b provided on the first end side communicates with the first coolant flow path 61.

Figure 6:
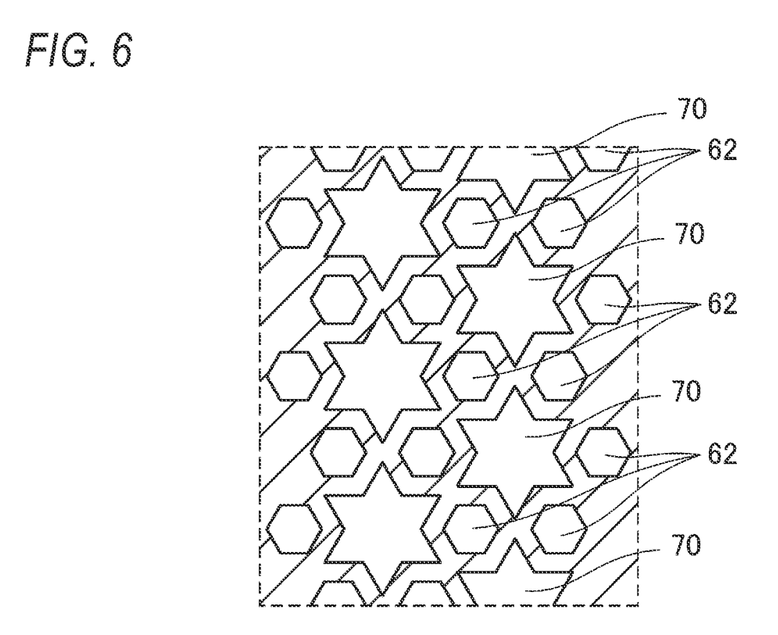
FIG. 6 is a diagram showing a part of a cross section of second coolant flow paths 62 and the gas flow paths 70 (cross section of Z portion in FIG. 3).

As shown in FIG. 6, the plurality of second coolant flow paths 62 and gas flow paths 70 are provided. Each second coolant flow path 62 has a regular hexagonal cross section, and each gas flow path 70 has a hexagram-shaped cross section. The plurality of gas flow paths 70 are arranged in a zigzag manner or a staggered manner, and the second coolant flow paths 62 are arranged between and/or around the adjacent gas flow paths 70. Since the plurality of second coolant flow paths 62 are arranged in a manner of surrounding one gas flow path 70, a gas cooling efficiency can be enhanced.

The high-temperature gas generated in the gas turbine engine 2 flows through the gas flow paths 70, exchanges the heat with the coolant flowing through the second coolant flow paths 62, and is cooled. Since the gas flow paths 70 and the second coolant flow paths 62 are provided to extend from the first end side to the second end side in the axial direction of the water jacket 60, lengths of the flow paths are sufficiently secured. Therefore, the heat exchange between the high-temperature gas flowing through the gas flow paths 70 and the coolant flowing through the second coolant flow paths 62 can be sufficiently performed. The plurality of gas flow paths 70 are provided, and the plurality of second coolant flow paths 62 are provided along the gas flow paths 70, and thus, a surface area for the heat exchange between the high-temperature gas and the coolant is increased, and the heat exchange is further promoted.

The gas cooled by the heat exchange with the coolant is supplied to the accommodation space S from the gas outflow ports 70b, and cools the components such as the rotor 20, the stator 30, and the bearings 51 and 52. Accordingly, the water jacket 60 (specifically, the second coolant flow paths 62) can cool the high-temperature gas generated in the gas turbine engine 2 in the gas flow paths 70 and utilize the cooled gas for cooling the components of the power generator 1.

The third coolant flow path 63 is a flow path provided along the oil flow path 80. Specifically, the third coolant flow path 63 includes a circumferential coolant flow path 631 along the circumferential oil flow path 81 and an axial coolant flow path 632 along the axial oil flow path 82. The circumferential coolant flow path 631 is provided on the second end side of the first coolant flow path 61, and the coolant flows in the space between the protruding portion 411b of the outer wall 411 and the inner wall 412. The axial coolant flow path 632 is provided to extend from the second end side to the first end side in the axial direction, and the coolant flows in the space between the protruding portion 411a of the outer wall 411 and the inner wall 412.

The circumferential coolant flow path 631 and the axial coolant flow path 632 communicate with the first coolant flow path 61, that is, the coolant flowing through the first coolant flow path 61 also flows through the third coolant flow path 63. Accordingly, the oil flowing through the oil flow path 80 exchanges the heat with the coolant flowing through the third coolant flow path 63 and is cooled. Since the oil flow path 80 is provided to extend from the second end side to the first end side, a sufficient length of the flow path is ensured. Therefore, the heat exchange between the oil and the coolant in the third coolant flow path 63 can be sufficiently performed.

The oil flowing through the oil flow path 80 is discharged from the first oil outflow port 80b to the outside of the housing 40, and circulates so as to be supplied again from the oil supply port 91 to the accommodation space S through the external oil flow path (not shown). That is, the oil flow path 80 is a flow path through which the oil supplied to the accommodation space S is cooled, and a flow path through which the oil to be supplied to the accommodation space S is cooled.

As described above, in the housing 40 of the present embodiment, the single water jacket 60 cools the gas and the oil to be supplied to the components (rotor 20, stator 30, bearings 51 and 52, and the like) inside the housing 40. That is, a heat exchanger for cooling the gas and a heat exchanger for cooling the oil are integrated by the water jacket 60, and it is unnecessary to provide the heat exchangers separately, and thus, the cooling mechanism of the power generator 1 can be made compact.

As described above, the part of the oil flow path 80 (axial oil flow path 82 in the embodiment) is provided on the opposite side of the gas flow path 70 with the accommodation space S interposed therebetween. Therefore, even with a configuration in which the gas and the oil are cooled by one water jacket 60, mutual influences of the heat exchange between the gas and the coolant and the heat exchange between the oil and the coolant can be reduced. The entire oil flow path 80 may be provided on the opposite side of the gas flow path 70 with the accommodation space S interposed therebetween.

The housing 40 of the present embodiment may be, for example, metal additively manufactured, that is, 3D-printing additively manufactured by using powder metal. The metal additive manufacturing is a well-known molding technique in the related art, in which metal powder is melted with an electron beam or a fiber laser, layered and solidified to manufacture metal components, and is a method that enables the molding of metal members with complicated three-dimensional shapes and enables the molding of fine and precise 3D shapes. The gas flow paths 70, the oil flow path 80, and the water jacket 60 can be integrally formed with the body portion 41 by the 3D-printing additively manufacturing. That is, the housing 40 can be formed as a single component including the body portion 41, the water jacket 60, the gas flow paths 70, and the oil flow path 80, which can contribute to weight reduction of the housing 40 and reduction of manufacturing costs. According to the 3D-printing additive manufacturing, dimensions of the water jacket 60, the gas flow paths 70, and the oil flow path 80 can be easily designed. Furthermore, the gas flow paths 70, the second coolant flow path 62, and the like having complicated shapes for efficiently cooling the gas and the oil can be created.

Although the embodiment of the present disclosure has been described above with reference to the accompanying drawings, it is needless to say that the present invention is not limited to such an embodiment. It is apparent to those skilled in the art that various changes and modifications can be conceived within the scope of the claims, and it is also understood that such changes and modifications naturally belong to the technical scope of the present invention. Constituent elements in the embodiments described above may be combined freely within a range not departing from a spirit of the disclosure.

For example, in the above-described embodiment, the power generator 1 is exemplified as the rotary electric machine of the present disclosure, but the present invention is not limited thereto. The rotary electric machine of the present disclosure may be a motor as a drive source.

In the above-described embodiment, the gas turbine engine 2 is exemplified as the internal combustion engine connected to the rotary electric machine of the present disclosure, but the present invention is not limited thereto. The internal combustion engine may be an internal combustion engine other than a gas turbine engine (for example, a reciprocating engine).

In the above-described embodiment, the configuration in which the high-temperature gas generated in the gas turbine engine 2 connected to the power generator 1 is supplied to the power generator 1 is exemplified, but the present invention is not limited thereto. For example, the gas may be supplied to the power generator 1 from the gas outflow port of the compressor provided separately from the gas turbine engine 2.

In the above-described embodiment, the gas flow path 70 and the oil flow path 80 are provided on the water jacket 60, but the present invention is not limited thereto. For example, the gas flow paths 70 and/or the oil flow path 80 may be provided outside the water jacket 60 as long as the gas and the oil can exchange the heat with the coolant flowing through the water jacket 60.

In the above-described embodiment, the gas flow paths 70 and the second coolant flow paths 62 are formed in a solid cross section, but the present invention is not limited thereto. The gas flow paths 70 and the second coolant flow paths 62 may be implemented by pipes or the like. In the above-described embodiment, the oil flow path 80 includes the plurality of pipes provided with the water jacket 60, but the present invention is not limited thereto. The oil flow path 80 may be formed in the solid cross section.

In the above-described embodiment, the gas flow paths 70 are provided radially outward of the outer wall 411, and the oil flow path 80 is provided at the protruding portions 411a and 411b of the outer wall 411, but the present invention is not limited thereto. The gas flow paths 70 and the oil flow path 80 may be provided in the space between the outer wall 411 and the inner wall 412.

In the above-described embodiment, the cross section of the gas flow path 70 has the hexagram shape and the cross section of the second coolant flow path 62 has the hexagonal shape, but the shapes are not limited to thereto and can be any shape. These arrangements can also be designed freely.

The gas and the oil supplied to the components (rotor 20, stator 30, bearings 51 and 52, and the like) in the accommodation space S do not necessarily need to be used for cooling all components, and may be used for cooling or lubricating any one component.

In the present specification, at least the following matters are described. Although corresponding constituent elements and the like in the above embodiment are shown in parentheses, the present invention is not limited thereto.

(1) A rotary electric machine housing (housing 40) configured to accommodate a component (rotor 20, stator 30, bearings 51 and 52) of a rotary electric machine (power generator 1), the rotary electric machine housing including:
- a hollow body portion (body portion 41) configured to be in a hollow shape and having an accommodation space (accommodation space S) in which the component is accommodated;
- a water jacket (water jacket 60) provided at the body portion;
- an oil flow path (oil flow path 80) communicating with the accommodation space and through which an oil to be supplied to the component flows; and
- a gas flow path (gas flow path 70) communicating with the accommodation space and through which a gas to be supplied to the component flows,
- in which the oil flow path and the gas flow path are provided to enable the oil and the gas to exchange heat with a coolant flowing through the water jacket.

According to (1), the oil flow path and the gas flow path are provided to enable the oil and the gas to be supplied to the component in the accommodation space to exchange the heat with the coolant flowing through the water jacket. Since the oil and the gas are cooled by a common water jacket, it is necessary to separately provide a heat exchanger for cooling the gas and a heat exchanger for cooling the oil. Therefore, a cooling mechanism of the rotary electric machine can be made compact.

(2) The rotary electric machine housing according to (1), in which the oil flow path and the gas flow path are provided with the water jacket.

According to (2), since the oil flow path and the gas flow path are provided with the water jacket, the oil and the gas can be cooled with a more compact configuration.

(3) The rotary electric machine housing according to (1) or (2),
- in which the water jacket has a hollow cylindrical shape and is provided radially inward of an outer surface of the body portion.

According to (3), since the water jacket is provided radially inward of the outer surface of the body portion of the housing, the component of the rotary electric machine can be cooled. That is, the water jacket cools the component of the rotary electric machine, the oil in the oil flow path, and the gas in the gas flow path.

(4) The rotary electric machine housing according to any one of (1) to (3),
- in which the water jacket has a hollow cylindrical shape, and
- the oil flow path and the gas flow path are provided to extend from a one end side (first end side) to an other end side (second end side) in an axial direction of the water jacket.

According to (4), since the oil flow path and the gas flow path are provided to extend from the one end side to the other end side in the axial direction of the water jacket, lengths of the flow paths are sufficiently ensured. Therefore, the heat exchange between the oil and the coolant and the heat exchange between the gas and the coolant can be sufficiently performed.

(5) The rotary electric machine housing according to any one of (1) to (4),
- in which the water jacket has a hollow cylindrical shape, and
- at least a part of the oil flow path (axial oil flow path 82) is provided on an opposite side of the gas flow path with the accommodation space interposed therebetween.

According to (5), since at least the part of the oil flow path is provided on the opposite side of the gas flow path with the accommodation space interposed between the part of the oil flow path and the gas flow path, the heat exchange between the gas and the coolant and the heat exchange between the oil and the coolant can be prevented from influencing each other.

(6) The rotary electric machine housing according to any one of (1) to (5),
- in which a plurality of the gas flow paths are provided with the water jacket, and
- the water jacket includes a plurality of coolant flow paths (second coolant flow paths 62) provided along the plurality of gas flow paths.

According to (6), since the water jacket is provided with the plurality of gas flow paths and the plurality of coolant flow paths provided along the plurality of gas flow paths, a surface area over which the heat is exchanged between the gas and the coolant is increased. Therefore, the heat exchange is further promoted.

(7) The rotary electric machine housing according to any one of (1) to (6),
- in which the body portion, the gas flow path, the oil flow path, and the water jacket are integrally formed by additive manufacturing using powder metal.

According to (7), the body portion, the gas flow path, the oil flow path, and the water jacket are integrally formed by the additive manufacturing using powder metal. Accordingly, the configuration contributes to weight reduction and manufacturing cost reduction. Lengths and dimensions of the water jacket, the gas flow path, and the oil flow path can be easily designed. Furthermore, the gas flow path, the oil flow path, and the water jacket having complicated shapes for efficiently cooling the gas and the oil can be created.

(8) A rotary electric machine (power generator 1), including:
- the rotary electric machine housing according to any one of (1) to (7); and
- a rotor (rotor 20) and a stator (stator 30) accommodated in the body portion,
- in which a rotor shaft (rotor shaft 10) of the rotor is connected to a rotating shaft of an internal combustion engine (gas turbine engine 2) in which the gas is generated,
- the gas flow path communicates with a gas outflow port of the internal combustion engine,
- the water jacket cools the gas flowing through the gas flow path, and
- at least one of the rotor or the stator is supplied with the gas cooled while flowing through the gas flow path.

According to (8), the gas generated in the internal combustion engine is cooled in the gas flow path and is supplied to the rotor and/or the stator. Therefore, the gas generated in the internal combustion engine can be cooled in the gas flow path and utilized for cooling the rotor and/or the stator.

(9) A rotary electric machine (power generator 1), including.
  the rotary electric machine housing according to any one of (1) to (7); and
  a rotor (rotor 20) and a stator (stator 30) accommodated in the body portion,
  in which the body portion is provided with an oil supply port (oil supply port 91) that supplies the oil to the accommodation space,
  at least one of the rotor or the stator is cooled by the oil supplied from the oil supply port,
  the oil that cools at least one of the rotor or the stator is guided to the oil flow path communicating with the accommodation space, and
  the water jacket cools the oil flowing through the oil flow path.

According to (9), the water jacket can cool the oil that exchanges the heat with the rotor and/or the stator.

(10) An additive manufacturing method of additively manufacturing the rotary electric machine housing according to any one of (1) to (6) by using powder metal the additive manufacturing method including,
  integrally forming the body portion, the gas flow path, the oil flow path, and the water jacket.

According to (10), the body portion, the gas flow path, the oil flow path, and the water jacket are integrally formed by the additive manufacturing using powder metal. Accordingly, the configuration contributes to the weight reduction and the manufacturing cost reduction. Lengths and dimensions of the water jacket, the gas flow path, and the oil flow path can be easily designed. Furthermore, the gas flow path, the oil flow path, and the water jacket having complicated shapes for efficiently cooling the gas and the oil can be created.

What is claimed is:

1. A rotary electric machine housing configured to accommodate a component of a rotary electric machine, the rotary electric machine housing comprising:
  a body portion configured to be in a hollow shape and having an accommodation space in which the component is accommodated;
  a water jacket provided at the body portion;
  an oil flow path communicating with the accommodation space and through which an oil to be supplied to the component flows; and
  a gas flow path communicating with the accommodation space and through which a gas to be supplied to the component flows,
  wherein the oil flow path and the gas flow path are provided to enable the oil and the gas to exchange heat with a coolant flowing through the water jacket.

2. The rotary electric machine housing according to claim 1,
  wherein the oil flow path and the gas flow path are provided with the water jacket.

3. The rotary electric machine housing according to claim 1,
  wherein the water jacket has a hollow cylindrical shape and is provided radially inward of an outer surface of the body portion.

4. The rotary electric machine housing according to claim 1,
  wherein the water jacket has a hollow cylindrical shape, and
  the oil flow path and the gas flow path are provided to extend from a one end side to an other end side in an axial direction of the water jacket.

5. The rotary electric machine housing according to claim 1,
  wherein the water jacket has a hollow cylindrical shape, and
  at least a part of the oil flow path is provided on an opposite side of the gas flow path with the accommodation space interposed therebetween.

6. The rotary electric machine housing according to claim 1,
  wherein a plurality of the gas flow paths are provided with the water jacket, and
  the water jacket includes a plurality of coolant flow paths provided along the plurality of gas flow paths.

7. The rotary electric machine housing according to claim 1,
  wherein the body portion, the gas flow path, the oil flow path, and the water jacket are integrally formed by additive manufacturing using powder metal.

8. A rotary electric machine, comprising:
  the rotary electric machine housing according to claim 1; and
  a rotor and a stator accommodated in the body portion,
  wherein a rotor shaft of the rotor is connected to a rotating shaft of the internal combustion engine in which the gas is generated,
  the gas flow path communicates with a gas outflow port of the internal combustion engine,
  the water jacket cools the gas flowing through the gas flow path, and
  at least one of the rotor or the stator is supplied with the gas cooled while flowing through the gas flow path.

9. A rotary electric machine, comprising:
  the rotary electric machine housing according to claim 1; and
  a rotor and a stator accommodated in the body portion,
  wherein the body portion is provided with an oil supply port that supplies the oil to the accommodation space,
  at least one of the rotor or the stator is cooled by the oil supplied from the oil supply port,
  the oil that cools at least one of the rotor or the stator is guided to the oil flow path communicating with the accommodation space, and
  the water jacket cools the oil flowing through the oil flow path.

10. An additive manufacturing method of additively manufacturing the rotary electric machine housing according to claim 1 by using powder metal, the additive manufacturing method comprising:
  integrally forming the body portion, the gas flow path, the oil flow path, and the water jacket.

* * * * *